United States Patent [19]
Phillips, Sr.

[11] Patent Number: 4,685,047
[45] Date of Patent: Aug. 4, 1987

[54] APPARATUS FOR CONVERTING RADIO FREQUENCY ENERGY TO DIRECT CURRENT

[76] Inventor: Raymond P. Phillips, Sr., 1200 S. Frances, Terrell, Tex. 75160

[21] Appl. No.: 886,138

[22] Filed: Jul. 16, 1986

[51] Int. Cl.⁴ ............................................. H02M 7/06
[52] U.S. Cl. ...................................... 363/126; 307/151
[58] Field of Search ................. 363/125, 126; 307/151

[56] References Cited

U.S. PATENT DOCUMENTS

| | | | |
|---|---|---|---|
| 649,621 | 11/1901 | Tesla | 455/39 |
| 685,957 | 5/1902 | Tesla | 455/619 |
| 3,434,678 | 3/1969 | Brown et al. | 307/151 |
| 3,445,767 | 5/1969 | Beard | 324/78 |
| 3,678,365 | 8/1972 | Fremiot | 307/151 |
| 3,723,891 | 3/1973 | Whitely | 307/246 |
| 3,760,257 | 9/1973 | Fletcher et al. | 307/151 |
| 3,784,845 | 1/1974 | Haas | 307/519 |
| 3,792,290 | 2/1974 | Brocker | 307/522 |
| 3,944,935 | 3/1976 | Plant | 307/519 |
| 4,079,268 | 3/1978 | Fletcher et al. | 307/151 |
| 4,079,325 | 3/1978 | Mawhinney et al. | 307/261 |
| 4,085,377 | 4/1978 | Turski et al. | 307/519 |
| 4,195,237 | 3/1980 | Meslener | 307/261 |
| 4,297,557 | 10/1981 | Tyler et al. | 219/10.55 B |
| 4,360,741 | 11/1982 | Fitzsimmons et al. | 307/151 |
| 4,360,865 | 11/1982 | Yasumura et al. | 363/126 |
| 4,393,441 | 8/1983 | Enge | 363/126 |

Primary Examiner—Patrick R. Salce
Assistant Examiner—Jeffrey Sterrett
Attorney, Agent, or Firm—Millen & White

[57] ABSTRACT

Apparatus for and methods of converting radio frequency energy into direct current for generating electric power includes a dipolar antenna for receiving radio frequency energy and a circuit connected thereto for converting the radio frequency energy to direct current. The circuit has a positive output line connected to one pole of the antenna and a negative output line connected to the other pole of the antenna. A positive transmitting diode is in the positive output line and a negative transmitting diode is in the negative output line. First and second bus lines and a pair of tuned circuits of opposite polarity couple the positive output line and negative line to the bus line with one of the bus lines being connected to ground. Each tuned circuit includes a first bridging line connecting the positive output line to the first and second ground lines and a second bridging line connecting the negative output line to the first and second ground lines. Each bridging line has a diode therein oriented at a polarity which is reverse with respect to the input diode. The bridging lines of each tuned circuit are connected to one another by an inductance and have capacitors disposed between the diode and the bus lines. A direct current device is connected to the positive line of the circuit.

11 Claims, 1 Drawing Figure

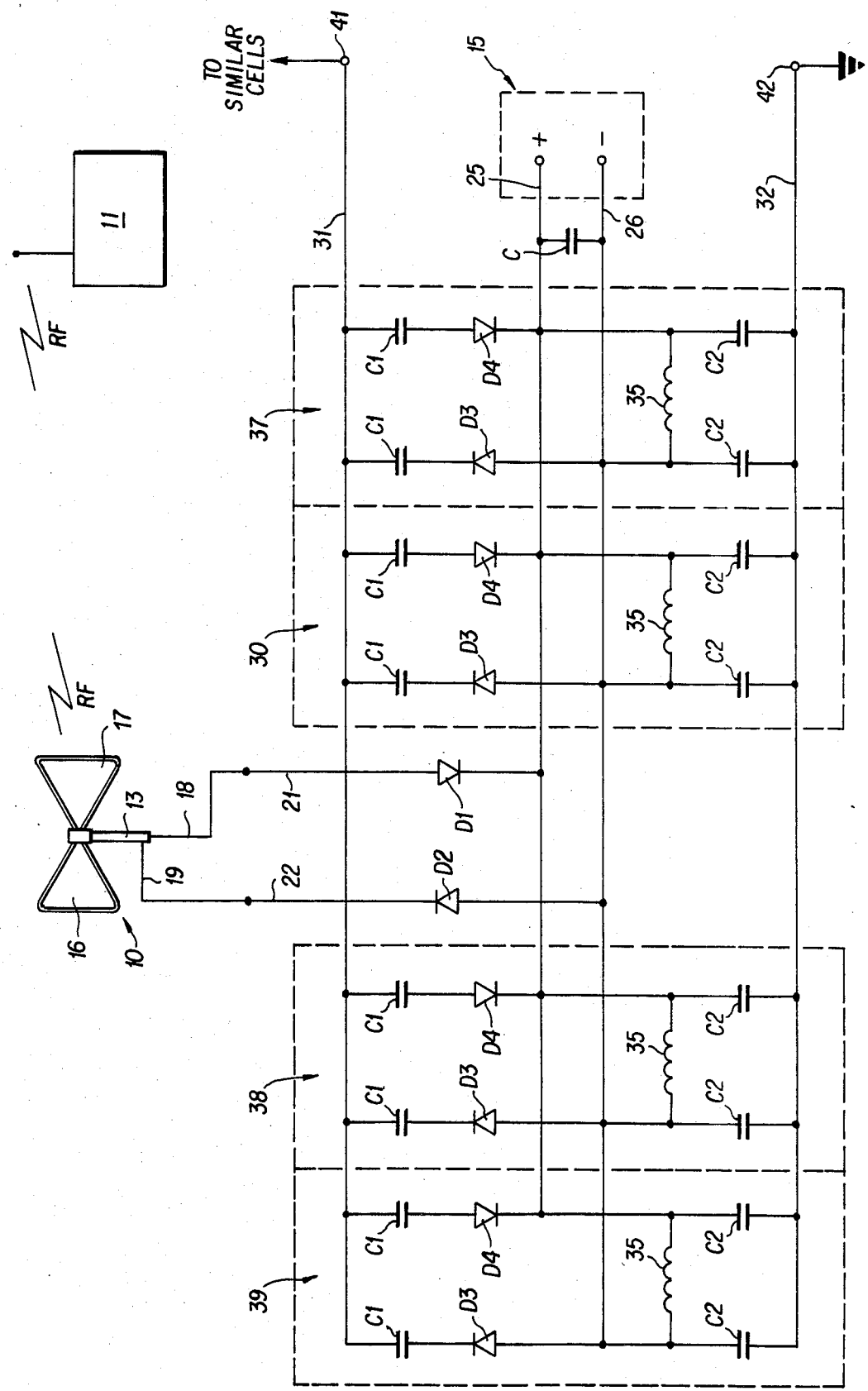

APPARATUS FOR CONVERTING RADIO FREQUENCY ENERGY TO DIRECT CURRENT

BACKGROUND OF THE INVENTION

1. Field of the Invention

The instant invention relates to methods of an apparatus for converting radio frequency energy to direct current; more particularly, the instant invention relates to methods and apparatus for converting radio frequency energy to direct current wherein the direct current is of sufficient magnitude to power devices such as battery charges and electric motors without the use of amplification.

2. Technical Considerations in Prior Art

There has long been interest in technology directed to transmitting electrical energy over a distance without utilizing conductors, such as wire conductors. Development of such a technology has enormous potential. This was first recognized by Nikola Tesla who in 1899 constructed a 200 foot Tesla coil rated at 300 kilowatts and 150 kilocycles. Tesla hoped to set up standing waves of electrical energy around the whole surface of the earth, so that receiving antennas set at optimum points could tap the power when needed. Tesla was able to light hundreds of lamps at a distance of about 40 kilometers with his device without utilizing electrical conductors. The scheme has generally remained a scientific curiosity but has provided the initial groundwork for current developments wherein attempts are being made to transmit power by microwaves. However, power transmitted by microwaves is envisioned in the form of a beam of very high intensity which is focused from a microwave generator to a receiving antenna. This technology is envisioned as being used for many types of purposes such as transmitting microwave energy collected from gigantic solar power satellites and "star wars"-type weapons systems. However, the focused microwave beam is not suitable for many applications in that the beam must be directed toward a receiving antenna and cannot be transmitted through most objects, including living objects, without destroying the objects.

The instant invention relies on converting energy from standing waves which are emitted from radio frequency antennas in the RF range rather than the microwave range. Of particular interest are very low frequencies which are not used in communications and are available for transmitting power. Also of interest with respect to the instant invention are the low frequency waves emitted by the earth due to pulsation thereof caused by its magnetic field. These low frequency standing "earth" waves can be picked up by receivers tuned thereto.

SUMMARY OF THE INVENTION

It is an object of the invention to provide new and improved methods of an apparatus for converting radio frequency currents to direct current for practical uses other than communications, wherein the direct current energy converted from the radio frequency input energy does not require amplification.

Upon further study of the specification and appended claims, further objects and advantages of this invention will become apparent to those skilled in the art.

The instant invention contemplates an RF antenna for receiving radio waves. The RF antenna connected to a circuit configured in accordance with the principles of the instant invention to convert the RF signals to direct current. The radio frequency signals received by the antenna are transmitted to first and second leads, with one lead being rectified to transmit positive voltage and the other lead being rectified to transmit negative voltage. The positive voltage lead being connected directly to a positive output line and the negative voltage lead being connected directly to a negative output line. The positive output line is connected to a pair of bus lines through a first pair of capacitors, while the negative output line is connected to the pair of bus lines by a second pair of capacitors. Disposed between the first bus line and the positive output line is a reverse diode of negative polarity, while disposed between the negative output line and first bus line is a reverse diode of positive polarity. The positive and negative output lines are connected to one another through an inductance which is in parallel with the capacitors of the first and second pair connected between the second bus line and the positive and negative output lines.

In accordance with one embodiment of the invention the afore-described circuit is duplicated for each positive and negative output line. In accordance with another embodiment of the invention, the afore-described circuitry is coupled to additional circuits identically configured in order to increase the direct current output of the arrangement.

In accordance with a further configuration of the invention, the antenna utilized is a dipolar antenna of aluminum wire arranged in a "butterfly" configuration.

The instant invention further contemplates the method of utilizing the afore-described elements so as to generate direct current having sufficient power to perform tasks such as charging batteries, lighting lamps and powering direct current electric motors without the use of amplifiers.

BRIEF DESCRIPTION OF THE DRAWING

Various other objects, features and attendant advantages of the present invention will be more fully appreciated as the same becomes better understood when considered in connection with the accompanying drawing, in which like reference characters designate the same or similar parts throughout the several views, and wherein:

There is shown a diagram of a circuit in accordance with the instant invention in combination with a driven device and a dipolar antenna which receives radio frequency waves which are converted to DC current for powering the driven device.

DESCRIPTION OF THE PREFERRED EMBODIMENT

Referring now to the drawing, there is shown a dipolar antenna, designated generally by the numeral 10, which receives radio frequency waves from an RF transmitter 11. The radio frequency waves are transmitted to a radio frequency to direct current converting circuit, designated generally by the numeral 12, through a coaxial cable 13 and DC current from the circuit 12 is used to power an output device, designated generally by the numeral 15, which may for example by a battery charger DC motor or lighting device. The circuit 12 has no other power inputs other than the radio frequency energy transmitted thereto by the antenna 10 and therefore includes no amplifiers for amplifying the RF energy.

The source of radio frequencies convertible to direct current by the circuit shown may include sources of high frequency, low frequency (LF), very low frequency (VLF) and extremely low frequency (ELF) radio waves as well as seismic vibration of the earth's magnetic fields.

Preferably, the dipolar antenna 10 is formed of two triangular loops of aluminum wire 16 and 17, one of which is connected to the annular conductor 18 of the coaxial cable 13 and the other of which is connected to the center conductor 19 of the coaxial cable. The size of the bipolar antenna 10 is dependent on the particular application to which it is put. In accordance with one embodiment of the invention, the antenna 10 is approximately 12 inches in width and 18 inches in length. Such an antenna is used to receive five watt energy, such as that generated by a walkie-talkie or citizen-band radio.

The annular conductor 18 of the coaxial cable 13 is connected to a positive lead 21 of the circuit 12, while the center conductor 19 of the coaxial cable is connected to a negative lead 22 of the circuit. A positive transmitting diode D1 is disposed between the lead 21 and the remainder of the circuit 12 while a negative transmitting diode D2 is disposed between the lead 21 to a positive output line 25 while the negative diode D2 is connected to a negative output line 26. Accordingly, the positive voltages with respect to ground are produced on output line 25 and negative voltages with respect to ground are produced on output line 26.

In order to provide a DC output of sufficient power, a plurality of inductance-capacitance, RF, tuned circuits 30, each forming a positive cell, or a negative cell, are utilized for connecting the positive output line 25 and negative output line 26 to first and second bus lines 31 and 32, respectively. Bus line 32 is connected to ground while bus line 32 can be connected to circuits similar to circuit 12. The positive output line 25 is connected by a first bridging line 33 to the first and second bus lines 31 and 32 while the negative output line 26 is connected by a second bridging line 34 to the first and second bus lines. The bridging line 33 has capacitors C1 and C2 disposed between the positive output line 25 and the first and second bus lines 31 and 32, while the bridging line 34 also has capacitors C1 and C2 dispensed between the negative output line 26 and the first and second bus lines 31 and 32. Connected between the bridging lines 33 and 34, is an inductor 35 which serves as an RF choke, while disposed between the positive output line 25 and the capacitor C1 there is a negative polarity diode D4 referred to herein as a bridging diode and disposed between the negative output line 26 and capacitor C1 in line 34 there is a positive polarity diode D3 referred to herein as a bringing diode. As is seen of the drawing, the RF tuned circuit cell 30 is repeated a plurality of times. In the specific example shown, the circuit 12 has separate cells 30, 37, 38 and 39. The cells 30 and 38 are of opposite polarity and balance one another while the cells 37 and 39 of opposite polarity and also balance one another. In order for the system to function, a pair of opposite polarized cells must be utilized. The particular number of cells 30 and the value of the components thereof are determined by the configuration of the dipolar antenna 10 and the power and frequency of the RF transmitter 11.

The radio frequency to direct current conversion circuit 12 may itself be connected to a duplicate circuit via pins 41 so as to provide additional direct current output on lines similar to positive output line 25 and negative output line 26 the output lines may be connected together in order to boost the total output of the system.

An operative embodiment of the invention utilizes the following elements:

Diodes D1, D2, D3 and D4—Germanium Diodes, Archer 1 N34A, Catalog #1123.
Inductor 35–47 Milli henry R. F. Choke
Capacitors C1 and C2–0.47 Pico Farads at 200 volts
Coaxial Cable 13—50 ohms
Dipolar Antenna 10—aluminum wire triangular loops approximately 12 inches by 18 inches.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Apparatus for converting radio frequency energy into direct current for generating electric power, the apparatus comprising:

a dipolar input for receiving radio frequency energy;

a positive output line connected to one pole of the dipolar input and a negative output line connected to the other pole of the dipolar input;

a positive transmitting input diode means in the positive output line and a negative transmitting input diode means in the negative output line;

first and second bus lines and a pair of tuned circuits of opposite polarity coupling the positive output line and negative output line to the bus lines, one of the bus lines being connected to ground;

each tuned circuit including a first bridging line connecting the positive output line to the first and second bus lines and a second bridging line connecting the negative output line to the first and second bus lines, each bridging line having a bridging diode means therein oriented at a polarity which is reverse with respect to the transmitting input diode means of the respective output line; the bridging lines of each tuned circuit being connected to one another by an inductance and having capacitors disposed between the bridging diode means thereon and the bus lines, and a direct current device connected to the bridging lines of the tuned circuit.

2. The apparatus of claim 1, wherein there are a plurality of similarly configured tuned circuits connected between the output lines and the bus lines.

3. The apparatus of claim 2, wherein there are a plurality of radio frequency-to-direct current conversion circuits connected to one another to provide a direct current power array tuned to a specific radio frequency such as a high frequency source, low frequency source, very low frequency source, extremely low frequency source, or source created by seismic vibrations of the earth's magnetic field.

4. The apparatus of claim 3 wherein the dipolar input is a dipolar antenna.

5. The apparatus of claim 1, wherein the device connected to the output lines is a direct current motor.

6. The apparatus of claim 1, wherein the device connected to the output line is an illuminating device.

7. The apparatus of claim 1, wherein the device connected to the output lines is a battery charger.

8. The apparatus of claim 1, wherein the device connected to the output lines is a DC-to-AC inverter.

9. The apparatus of claim 1, wherein there are a plurality of radio frequency to direct current converter circuits connected to one another to form an array of circuits tuned to a particular radio frequency.

10. The apparatus of claim 1 wherein the dipolar input is a dipolar antenna.

11. The apparatus of claim 10, wherein the dipolar antenna utilizes aluminum wire arranged in pair of triangular loops.

* * * * *

UNITED STATES PATENT AND TRADEMARK OFFICE
CERTIFICATE OF CORRECTION

PATENT NO. : 4,685,047

DATED : August 4, 1987

INVENTOR(S) : Raymond P. Phillips, Sr.

It is certified that error appears in the above-identified patent and that said Letters Patent is hereby corrected as shown below:

On the Title Page "11 Claims" should read -- 12 Claims --.

Column 4, Claim 1, Line 21:

Reads: "into direct current for generating electric power, the"

Should Read: --into direct current, the--

Column 4, Claim 5, Line 62:

Reads: "nected to the output lines is a direct current motor."

Should Read: --nected to the output lines is a direct-current motor.--

Column 4, Claim 8, Line 68:

Reads: "nected to the output lines is a DC-to-AC inverter. "

Should Read: --nected to the output lines is a DC-to-AC converter.--

Please add the following new claim:

--12. The apparatus of claim 1 wherein the dipolar input is a coazial cable.--

Signed and Sealed this
Third Day of November, 1987

Attest:

DONALD J. QUIGG

Attesting Officer          Commissioner of Patents and Trademarks

UNITED STATES PATENT AND TRADEMARK OFFICE
CERTIFICATE OF CORRECTION

PATENT NO. : 4,685,047

DATED : August 4, 1987

INVENTOR(S) : Raymond P. Phillips, Sr.

It is certified that error appears in the above-identified patent and that said Letters Patent is hereby corrected as shown below:

On the Title Page, Item [57],
IN THE ABSTRACT:

Line 1:  Reads: "Apparatus for and methods of converting radio fre-"
  Should Read:  --Apparatus for converting radio fre- --

Line 9:  "transmitting diode is in the positive output line and a"
  --transmitting diode is located in the positive output line and a"

Line 10: "negative transmitting diode is in the negative output"
  --negative transmitting diode is located in the negative output--

Line 24: "to the positive line of the circuit"
  --to the output lines of the circuit--

COL. 1
Line 9: "the instant invention relates to methods of an appara-"
  --the instant invention relates to appara- --

COL. 1
Line 8: "to methods and apparatus for converting radio fre-"
  --to apparatus for converting radio fre- --

COL. 1
Line 14: "as battery charges and electric motors without the use"
  --as battery chargers and electric motors without the use--

UNITED STATES PATENT AND TRADEMARK OFFICE
CERTIFICATE OF CORRECTION

PATENT NO. : 4,685,047

DATED : August 4, 1987

INVENTOR(S) : Raymond P. Phillips, Sr.

It is certified that error appears in the above-identified patent and that said Letters Patent is hereby corrected as shown below:

COL. 1
Line 29: "tific curiosity but has provided the initial groundwork"
--tific curiosity, but has provided the initial groundwork--

COL. 1
Line 57: "improved methods of an apparatus for converting radio"
--improved apparatus for converting radio--

COL. 2
Line 6: "tive voltage. The positive voltage lead being connected"
--tive voltage. The positive voltage lead is connected--

COL. 2
Line 8: "age lead being connected directly to a negative output"
--age lead is connected directly to a negative output--

COL. 2
Line 58: "ted to a radio frequency to direct current converting"
--ted to a radio frequency-to-direct current converting--

COL. 2
Line 62: "by the numeral 15, which may for example by a battery"
--by the numeral 15, which may for example be a battery--

UNITED STATES PATENT AND TRADEMARK OFFICE
CERTIFICATE OF CORRECTION

PATENT NO. : 4,685,047

DATED : August 4, 1987

INVENTOR(S) : Raymond P. Phillips, Sr.

It is certified that error appears in the above-identified patent and that said Letters Patent is hereby corrected as shown below:

COL. 3
Line 23: "and the remainde of the circuit 12 while a negative"
--and the remainder of the circuit 12, while a negative--

COL. 3
Line 25: "to a positive output line 25 while the negative diode D2"
--a positive output line 25, while the negative transmitting diode D2--

COL. 3
Line 31: "a plurality of inductance-capacitance, RF, tuned cir-"
--a plurality of inductance-capacitance, RF-tuned cir- --

COL. 3
Line 32: "cuits 30, each forming a positive cell, or a negative cell,"
--cuits 30, each forming either a positive cell or a negative cell,--

COL. 3
Line 50: "polarity diode D4 referred to herein as a bridging diode"
--polarity diode D4, referred to herein as a bridging diode--

COL. 3
Line 53: "D3 referred to herein as a bringing diode. As is seen of"
--D3, referred to herein as a bridging diode. As is seen of--

COL. 3
Line 58: "other while the cells 37 and 39 of opposite polarity and"
--other, while the cells 37 and 39 of opposite polarity--

UNITED STATES PATENT AND TRADEMARK OFFICE
CERTIFICATE OF CORRECTION

PATENT NO. : 4,685,047

DATED : August 4, 1987

INVENTOR(S) : Raymond P. Phillips, Sr.

It is certified that error appears in the above-identified patent and that said Letters Patent is hereby corrected as shown below:

COL. 3
Line 67: "via pins 41 so as to provide additional direct current"
--via pin 41 so as to provide additional direct current--

COL. 4
Line 1: "negative output line 26 the output lines may be con-"
--negative output line 26. The output lines may be con- --

Claim 12, line 2: Change "coazial" to --coaxial--.

Signed and Sealed this

Eleventh Day of July, 1989

Attest:

DONALD J. QUIGG

Attesting Officer

Commissioner of Patents and Trademarks